United States Patent
Rogers

[11] 3,808,879
[45] May 7, 1974

[54] ULTRASONIC WALL THICKNESS MEASUREMENT

[75] Inventor: Philip A. Rogers, Houston, Tex.

[73] Assignee: AMF Incorporated, White Plains, N.Y.

[22] Filed: Aug. 3, 1972

[21] Appl. No.: 277,732

[52] U.S. Cl. ............................................. 73/67.9
[51] Int. Cl. .......................................... G01n 29/04
[58] Field of Search............ 73/67.8 R, 67.8 S, 67.9

[56] References Cited
UNITED STATES PATENTS

| | | |
|---|---|---|
| 3,372,576 | 3/1968 | Dory ................................... 73/67.9 |
| 3,354,700 | 11/1967 | Schindler ............................. 73/67.9 |
| 3,646,805 | 3/1972 | Walters ................................ 73/67.9 |

Primary Examiner—Richard C. Queisser
Assistant Examiner—Arthur E. Korkosz
Attorney, Agent, or Firm—George W. Price; John H. Gallagher

[57] ABSTRACT

Method and apparatus for ultrasonic measurement of average wall thickness. Only true and accurate wall thickness measurements are averaged, and average thickness of wall is indicated in continuous, accurate manner. Invention is particularly useful where there is continuous relative motion with respect to measured wall, and where surface of wall is irregular.

13 Claims, 2 Drawing Figures

ULTRASONIC WALL THICKNESS MEASUREMENT

BACKGROUND OF THE INVENTION

Measurement of wall thickness of metal plate and tubular goods by the use of ultrasonic inspection equipment has been practiced for many years. Despite the advances that have been made in the art, equipment has not been available which will give a highly accurate reading of average wall thickness when the ultrasonic transducer and the inspected member are moving continuously at a high rate of speed relative to each other. For use in pipe and plate mills, and in some "field" uses, it is desired that the ultrasonic inspection equipment be capable of providing accurate average wall thickness measurements when the relative speed between the inspection apparatus and the member being inspected is as high as 125 feet per minute.

A primary reason for reduced accuracy in average wall thickness measurements made by ultrasonic inspection apparatus that operates continuously at high speed is that a relatively large number of signal drop-outs are encountered. Signal drop-out is a term that refers to the situation where an ultrasonic echo signal is not received by the inspection apparatus following the transmission of ultrasonic energy into the member being inspected. Drop-outs occur as a result of poor ultrasonic coupling to the member being inspected, and when the reflected signal is dispersed and/or directed away from its intended return path by an irregular reflecting surface. For example, when inspecting used pipe whose surface is corroded, the drop-out rate might be as high as 70 to 90 percent of the transmitted ultrasonic pulses.

The reason that signal drop-outs give rise to inaccurate readings is that a timing signal, whose duration is intended to be a function of wall thickness, is commenced at a time when the transmitted ultrasonic pulse is, or should be, reflected from the near surface of the wall being inspected. Under proper operating conditions the timing signal terminates when an ultrasonic echo signal is received from the back surface of the wall. If a near surface echo signal is not received the timing signal will not commence at the proper time. If the back surface echo signal is not received, the timing signal continues to its maximum permissible time limit. These two types of signals bear no relationship to the true wall thickness. When a large number of drop-outs are averaged in with a number of true wall thickness measurements, it may be seen that the resultant average reading can be in error by a considerable magnitude. As mentioned above, this problem is considerably aggravated when attempting to perform continuous wall thickness measurements as high relative speeds and when performing measurements on members having uneven surfaces.

SUMMARY OF THE INVENTION

In accordance with this invention, ultrasonic apparatus for providing average wall thickness measurements operates in a manner so that only timing signals that represent true wall thickness measurements are allowed to be averaged to provide a resultant average wall thickness reading. Timing signals resulting from signal drop-outs are not averaged in with true wall thickness measurement signals. Furthermore, the read out or display portion of the equipment functions to continuously preserve and make available the accurate average wall thickness measurement and is not affected by the fact that undesired signal drop-outs are continuously being "ignored" by the portion of the equipment that derives the average wall thickness measurements.

DETAILED DESCRIPTION OF PREFERRED EMBODIMENT

Figure 1:
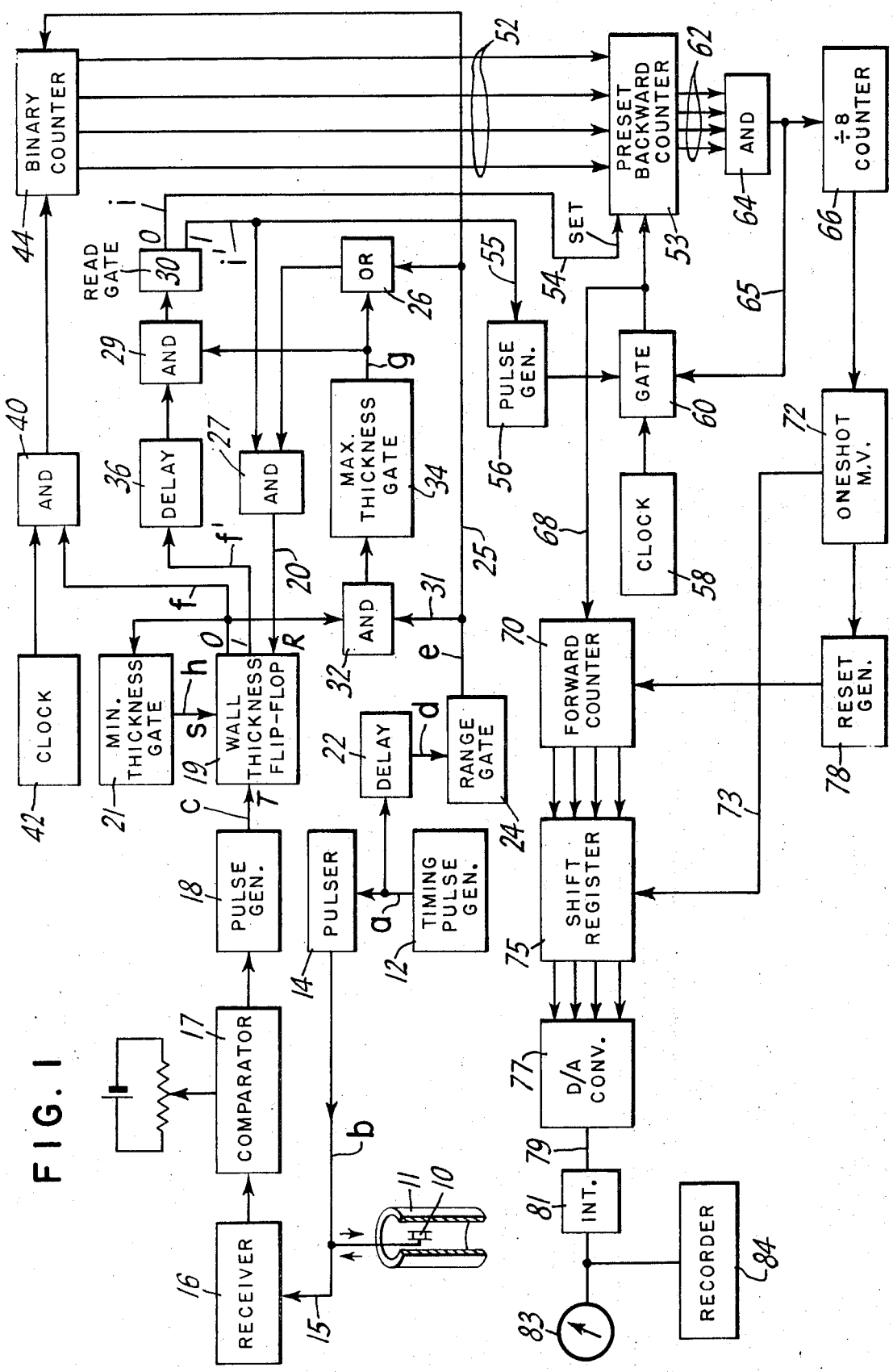
FIG. 1 is a simplified block diagram of ultrasonic average wall thickness measuring equipment constructed for operation in accordance with the present invention.

In the embodiment of the invention illustrated in FIG. 1, an ultrasonic transducing crystal 10 is located within a section of pipe 11 which is to be non-destructively inspected to obtain continuous readings of average wall thickness. It is assumed that pipe section 11 is a portion of a long string of continuous pipe or tubing that extends into a well bore. Transducing crystal 10 may be housed in a suitable tool that is lowered into the string of pipe or tubing. It is assumed that the well bore is filled with a liquid or drilling mud which propagates and couples ultrasonic energy. At least a portion of the electronic equipment represented in the block diagram of FIG. 1 also may be housed in the tool. Suitable connection may be made to power supply equipment and any other equipment of the system that may be located on the surface of the ground adjacent the well bore. After the tool is lowered to a desired depth in the well bore the inspection system is placed in operating condition and the tool with ultrasonic crstal 10 therein is rapidly withdrawn from the bore. Average wall thickness measurements of pipe or tubing 11 are continuously made as the crystal moves relative to the inner surface of the pipe. The transducing crystal may be made to rotate within the pipe, or two or more circumferentially spaced crystals may be employed in the tool to obtain wall thickness measurements at circumferentially spaced portions of the pipe, if desired.

Figure 2:
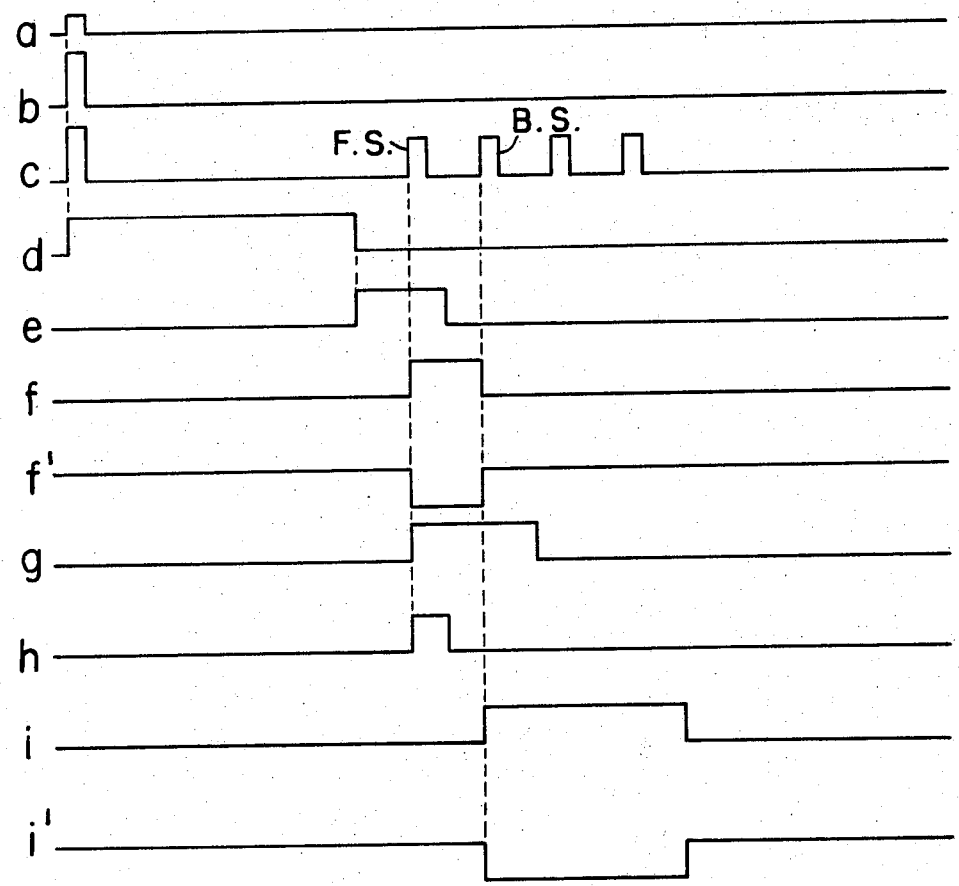
FIG. 2 is a series of waveforms used in explaining the operation of a portion of the equipment illustrated in FIG. 1.

A timing pulse generator 12 produces timing pulses at a desired repetition frequency. These timing pulses, FIG. 2a, are coupled to a pulser 14 which produces relatively high power electrical pulses, FIG. 2b, which are coupled to crystal transducer 10 that responds thereto to produce transmitted ultrasonic pulses. As is well understood in the art, a pulse of ultrasonic energy propagates to the inner surface of pipe 11, hereafter called front surface, and a portion thereof is reflected back to crystal 10. Another portion of the ultrasonic energy propagates through the pipe wall and is reflected back to crystal 10 from the outer surface of the pipe, hereafter called back surface. These two spaced ultrasonic reflections, or echoes, are transduced to electrical signals by crystal 10 and are coupled over lead 15 to a pulse receiver 16 which may be of known design. The output pulse of receiver 16 are coupled to a comparator circuit 17 which passes only pulses exceeding a predetermined magnitude, and the passed pulses trigger pulse generator 18 which produces in response thereto corresponding pulses of given amplitude and duration, as illustrated in FIG. 2c. The first pulse of FIG. 2c represents the transmitted pulse and the second and third pulses of FIG. 2c correspond respectively to the front surface reflection and back surface reflection of the transmitted pulse. The remaining pulses illustrated in FIG. 2c represent multiple echoes of the transmitted pulse. As will be understood from the description below, multiple reflection echoes do not affect the operation of the system.

The output of pulse generator 18 is coupled to the toggle input of wall thickness flip flop 19 which may be a RST flip flop connected to toggle in the J-K mode when it is armed or enabled by a proper signal on its input lead 20.

Timing pulse generator 12 also supplied timing pulses of FIG. 2a to a delay circuit 22 which may be a one shot multivibrator that responds to each timing pulse by triggering to its unstable state of fixed duration, as illustrated by the positive going pulse of FIG. 2d. The duration of this unstable state is chosen to include the time interval between the occurrence of a high power pulse from pulser 14 and the time just prior to the expected arrival of a front surface reflected signal. As will be seen, this delay prevents premature triggering of subsequent circuits in the system by the transmitted pulse from pulser 14, for example.

The output of delay circuit 22 is coupled to range gate 24 which may be a one shot multivibrator that is triggered to its unstable state of fixed duration, FIG. 2e, in response to the trailing edge of the positive pulse from delay circuit 22. As will be seen by comparing FIGS. 2e and 2c, the time duration of the positive pulse of range gate 21 is chosen to commence just prior to the expected time of arrival of a front surface reflection (F.S.), but the range gate pulse terminates before the expected time of arrival of a back surface reflection (B.S.).

The positive pulse from range gate 24, FIG. 2e, is coupled over lead 25, through OR gate 26 to one input terminal of AND gate 27. The other input to AND gate 27 is coupled to the 1 output terminal of read gate 30, a one shot multivibrator which at this time is in its stable state during which its 1 output is high to enable AND gate 27. Therefore, the range gate pulse of FIG. 2e passes through AND gate 27 and is coupled to input terminal 20 of wall thickness flip flop 19 to arm or enable that flip flop.

Because wall thickness flip flop 19 is armed at a time that commences at the leading edge of the range gate pulse of FIG. 2e, it will toggel to its first stable state, FIG. 2f, upon receiving the front surface reflection (F.S.) of FIG. 2c. Because wall thickness flip flop 19 is not armed to toggle prior to the beginning the range gate pulse, FIG. 2e, it will not toggle, or change states, in response to an earlier occurring signal such as a transmit pulse from pulser 14.

Referring back to range gate 24, its output, FIG. 2e, also is coupled over lead 31 to one input of AND gate 32. The other input to AND gate 32 is the 0 output of wall thickness flip flop 19. Prior to the receipt of a front surface reflection (F.S.), FIG. 2c, by wall thickness flip flop 19 its 0 output is low and AND gate 32 is closed. Upon receipt of a front surface reflection, the 0 output of wall thickness flip flop 19 goes high, and this change of state activates AND gate 32 and triggers maximum thickness gate 34, as illustrated in FIG. 2g. Maximum thickness gate 34 may be a one shot multivibrator having a fixed duration, as will be further explained.

The output of maximum thickness gate 34 is coupled through OR gate 26 to AND gate 27, which at this time already is enabled, and further is coupled to input terminal 20 of wall thickness flip flop 19. Output waveform FIG. 2g from maximum thickness gate 34 therefore maintains wall thickness flip flop 19 in an armed or enabled condition. The trailing edge of the pulse of FIG. 2g is chosen to occur at a time after the expected arrival of a back surface reflection (B.S.), FIG. 2c, from a wall of the maximum thickness to be measured and before the possible occurence of a multiple reflection echo signal.

Upon receipt at flip flop 19 of a back surface reflection (B.S.) during the time interval that flip flop 19 is armed by the positive going portion of the maximum thickness gate pulse of FIG. 2g, the flip flop toggles back to its first stable state, thus terminating the positive pulse of FIG. 2f. The duration of the pulse of FIG. 2f therefore is a function of the wall thickness being measured.

Upon termination of the maximum thickness gate pulse of FIG. 2g at input terminal 20 of flip flop 19, the flip flop is no longer armed and cannot thereafter toggle.

In the event that a back surface reflection (B.S.) is not received at the toggle input of flip flop 19 before the termination of the maximum thickness gate pulse of FIG. 2g at terminal 20, the flip flop will automatically be reset to its first stable state when it becomes unarmed or disabled. This operation prevents wall thickness flip flop 19 from being toggled by received signals which are multiple reflections of the back surface echo pulse, such as the fourth and fifth pulses of FIG. 2c.

A further protective feature is incorporated in the operation of wall thickness flip flop 19. When the flip flop is toggled to its second stable state upon receipt of a front surface reflection (F.S.), the change of state triggers minimum wall thickness gate 21, a one shot multivibrator having a short duration unstable state, as illustrated in FIG. 2h. This signal is coupled back to the S input terminal of flip flop 19 to prevent it from being further toggled by an input from pulse generator 18 until after the termination of the minimum thickness pulse of FIG. 2h. This operation prevents flip flop 19 from being toggled by multiple reflections from the front surface of pipe 10. This feature is particularly advantageous when inspecting the inside of used pipe whose surface may have corrosion pits therein. At an instant of time when a beam of ultrasonic energy is incident on both a corrosion pit and on an uncorroded surface, reflections from the corrosion pit will be received back at transducing crystal 10 at a later time than reflections from the uncorroded surface, thereby giving rise to multiple front surface reflections.

Returning now to the output of wall thickness flip flop 19 and its output signal FIG. 2f which is assumed to be a true wall thickness reading, the inverse of that signal, FIG. 2f', is coupled from the 1 output terminal through a delay means 36 which produces a delay which is quite brief in relationship to any of the time periods discussed thus far. The slightly delayed thickness signal, FIG. 2f', then is coupled to one input of AND gate 29. The other input to this AND gate is maximum wall thickness pulse of FIG. 2g. AND gate 29 is disabled during the negative portion of the wall thickness signal FIG. 2f', but the positive going trailing edge of that signal is passed through AND gate 29 since the gate still is enabled by the positive pulse of FIG. 2g. The trailing edge of the wall thickness pulse FIG. 2f' triggers read gate 30, a one shot multivibrator having an unstable state of fixed time duration, as illustrated in FIG. 2i.

It will be noted that read gate 30 can be triggered only when a back surface reflection (B.S.), FIG. 2c, is received at the toggle input of flip flop 19 prior to the termination of the maximum wall thickness gate pulse of FIG. 2g. If this relationship does not exist, as will occur in a signal drop-out situation, the termination of the maximum wall thickness pulse of FIG. 2g will unarm and reset wall thickness flip flop 19 and simultaneously will disable AND gate 29. Because of the brief delay provided by delay means 36, AND gate 29 will already be disabled by the time the positive going trailing edge of the inverse wall thickness signal FIG. 2f' appears at the input of the AND gate. Therefore, only true and accurate wall thickness signals will trigger read gate 30.

The wall thickness signal of FIG. 2f also is coupled as the enabling signal to one input of AND gate 40. A high frequency clock source 42 provides clock pulses to the other input of AND gate 40. Each time wall thickness flip flop 19 is in its second stable state, i.e., the waveform of FIG. 2f is positive, high frequency clock pulses are passed through AND gate 40 and are counted in binary counter 44. Thus, when the output of flip flop 19 represents a true wall thickness measurement, the count accumulated in counter 44 is proportional to the measured wall thickness. Since read gate 30 is triggered to its unstable state only in response to a true and accurate wall thickness signal, this change of state may be used to transfer from binary counter 44 the count accumulated therein at the time of said change of state. Because read gate 30 will not be triggered when a signal drop-out situation occurs, the accumulated count in counter 44 will not be transferred in such a situation.

Counter 44 is reset to zero count by the leading edge of the positive pulse from range gate 24, FIG. 2e, so that it is ready to accumulate a new count corresponding to measured wall thickness after each transmitted ultrasonic pulse.

Although the system thus far described provides true and accurate wall thickness measurement and effectively ignores signal drop-outs, known types of analog averaging and recording means are not suitable to provide accurate and reliable readings of average wall thickness measurements. The reason for this is that with a high signal drop-out rate, which may range as high as 70 to 90 percent when inspecting pitted surfaces at a continuous high rate of scan, no output signal is present for significant portions of the inspection time. This means that a large number of erroneous zero wall thickness measurements are averaged in with true wall thickness measurements, and the resultant reading is meaningless.

Returning to FIG. 1, the bits of the binary number in counter 44 are connected by leads 52 to the corresponding bit stages of preset backward counter 53. Upon the occurance of the positive going signal on the 0 output of read gate 30, FIG. 2i, that signal is coupled over lead 54 and functions as a set pulse to set into preset binary counter 53 the binary number coupled over leads 52 from counter 44. The signal on the 1 output from read gate 30, FIG. 2i', is coupled over lead 55 to the input of pulse generator 56 which may be a monostable multivibrator. Upon the occurrence of the positive going trailing edge of the pulse of FIG. 2i', pulse generator 56 produces a gating pulse which opens gate 60.

A block pulse source 58 is coupled to gate 60 which is opened by the gating pulse from pulse generator 56 to pass clock pulses to backward counter 53. The backward counter counts down from the binary number preset therein until a binary zero is registered in the counter. The state of each bit position of backward counter 53 is monitored on bit lines 62 and when the zero condition is present, AND gate 64 will open to pass a one count to a divide-by-eight counter 66. AND gate 64 also is coupled to gate 60 by way of lead 65 and supplies a disabling signal thereto to close the gate when backward counter 53 counts down to zero. The closing of gate 60 prevents further clock pulses from passing to backward counter 53.

The clock pulses that are coupled from clock pulse source 58 to backward counter 53 to cause it to count down to zero are coupled over lead 68 to forward counter 70 to cause that counter to count in the forward direction. Therefore, the binary number representing the pulse count applied to forward counter 70 each time backward counter 53 counts down to zero is the binary number representing a wall thickness measurement which was transferred from binary counter 44 and preset in backward counter 53.

The operation just described with respect to backward counter 53 and forward counter 70 is repeated each time a true wall thickness signal is gated from binary counter 44. When divide-by-eight counter 66 has accumulated a count of eight it activates one shot multivibrator 72 which produces on its output line 73 a shift pulse to shift into shift register 75 the total count accumulated in binary form in forward counter 70. One shot multivibrator 72 simultaneously activates reset generator 78 which produces a pulse whose trailing edge resets forward counter 70 to zero.

It may be seen that forward counter 70 accumulates a count equal to the total of eight successive pulse counts passed through gate 60. Therefore, the binary number transferred to shift register 75 is the sum of eight successive true wall thickness readings. It is to be noted that no false wall thickness readings arising from signal drop-outs are included in the total count accumulated in counter 70.

The binary number stored in shift register 75 is converted to an equivalent analog signal in digital to analog (D/A) converter 77. The analog signal on the output line 79 of D/A converter 77 persists until the next eight counts are accumulated in forward counter 70 at which time another binary number is shifted into shift register 75. D/A converter 77 then will provide a new continuous analog signal corresponding to the new binary number stored in shift register 75.

The succession of continuous analog signals from D/A converter 77 are integrated in integrator 81 and then coupled to meter 83 and to a retractor 84 for display and recording. Because eight successive wall thickness readings are accumulated in forward counter 70 before the contents of that counter are transferred to D/A converter 77, appropriate measures are taken at meter 83 and recorder 84 so that the indications and records provided represent one-eighth the value of the analog output from D/A converter 77. This then provides an average wall thickness reading of the member being inspected. It should be understood that the multiple eight, and corresponding dividing factor of one-eighth, ae chosen for convenience and that other multiplying and corresponding dividing factors may be used for arriving at an average wall thickness reading.

From the above discussion it is seen that extremely useful and accurate method and apparatus are provided for making average wall thickness measurements. Because read gate 30 will produce a gating pulse to pass the contents of binary counter 44 to backward counter 53 only when a reflected signal is received within a given time limit, which virtually assures that it is a proper back surface reflection, forward counter 70 accumulates only true and accurate wall thickness measurements and, in effect, erroneous and meaningless measurements are automatically ignored. Furthermore, the operation of D/A converter 77 in providing continuous analog signals to the read-out and display portion of the system provides continuous output signals even though there may be a large percentage of signal drop-outs and true wall thickness signals are gated from binary counter 44 in an irregular manner with time lapses between signals. The system of this invention prevents the read out and display from going to zero, or tending to go to zero, each time a time lapse occurs. This feature permits the system to be used when there is continuous high speed relative motion between the inspected member such as pipe 11 and crystal transducer 10. This type of operation is particularly important in ultrasonic inspection operations where a significant number of signal drop-outs are to be expected.

The circuitry and design logic represented in the simplified block diagram of FIG. 1 are merely examples of means fir carrying out the teachings of this invention. It s to be understood that different circuitry and different logic may be employed without departing from the teachings of this invention. Furthermore, in some situations it may be desirable to employ separate transmitting and receiving ultrasonic transducers rather than a single transducer.

I claim:

1. In a method of making an average wall thickness measurement of a walled member, the steps comprising directing ultrasonic energy from an ultrasonic transducer means onto and through a front surface of said member,
   starting a timing period at a time representing the time of incidence of said energy at the front surface of said member,
   concluding said timing period in response to receiving at said transducer means a reflection of ultrasonic energy from the back wall of the member, thereby to represent the propagation time of ultrasonic energy through the member, or alternatively
   concluding said timing period at a predetermined maximum time if reflected energy has not been received at the transducer means from said back wall,
   producing a set pulse when the timing period concludes before said predetermined maximum time,
   preventing the production of a set pulse if reflected energy from the back wall has not been received at the transducer before said predetermined maximum time,
   producing regularly occurring clock pulses,
   repeating the above steps to produce a predetermined number of set pulses,
   providing a coded digital signal representing the total of the number of clock pulses that occurred only in timing periods that are associated with the production of said predetermined number of set pulses.

2. The method of claim 1 and further including the step
   converting said coded signal to an indication or read out of an average of the number of pulses received during the time periods associated with the production of a set pulse.

3. The method of claim 1 and further including the steps
   establishing substantially continuous relative motion between the ultrasonic transducer means and said member, and
   continuing said recited steps to provide a continuous succession of said coded signals and a continuous and persisting indication of said average number of pulses.

4. A method of making an average wall thickness measurement comprising the steps
   from a region adjacent a front surface of a member whose average wall thickness is to be measured,
   directing a beam of ultrasonic energy onto and through said front surface,
   producing a first signal which represents the propagation time of a portion of said energy which is reflected from the front surface and received back at said region,
   producing a second signal which represents the propagation time of another portion of the energy which is reflected from a back surface of the member and received back at said region,
   starting a timing period in response to the first signal,
   concluding the timing period in response to the second signal or at the conclusion of a predetermined time after the first signal, whichever is first to occur,
   producing a set pulse when the second signal occurs before said predetermined time after the first signal,
   preventing the production of said set pulse when said predetermined time expires before the occurrence of said second signal,
   producing repetitively occurring clock pulses,
   counting the number of clock pulses that occur during said timing period,
   repeating the above steps to produce a succession of timing periods,
   providing a coded signal representing the total of the number of pulses counted only in a given number of said timing periods that are associated with the production of a set pulse,
   in response to said last named coded signal, providing an indication or read out representing average wall thickness of said member.

5. The method claimed in claim 4 and including the step establishing relative motion between said front surface and a means for directing said ultrasonic energy, whereby said succession of timing periods occur during said relative motion.

6. The method claimed in claim 4 wherein the step of providing a coded signal includes the steps upon command of each set pulse, presetting into a backward counter a coded number representing the number of said clock pulses counted during the corresponding timing period that concluded with the production of a respective set pulse, coupling clock pulses to the backward counter each time it is preset to cause it to count backward to some predetermined count, and counting the total number of clock pulses coupled to the backward counter during said given number of times that it is preset and then counts backward to the predetermined count.

7. The method claimed in claim 6 and further including the steps repeating during each of a succession of said given number of times the counting of the total number of clock pulses coupled to the backward counter to provide a succession of said second coded signals and a corresponding succession of indications or read outs representing average wall thickness.

8. The method claimed in claim 7 wherein the step of providing an indication or read out includes the steps converting said coded signals to corresponding persisting analog signals, and coupling said persisting analog signals to means for providing said indications or read outs representing average wall thickness.

9. Apparatus for making an average wall thickness measurement of a walled member, comprising ultrasonic transducer means for directing repetitive ultrasonic energy pulses onto and through a front surface of said member, means for starting each of a plurality of repetitive timing periods at a time representing the time of incidence of a respective ultrasonic pulse at said front surface, means for concluding each timing period at a time corresponding to the receipt at the transducer means of a reflection of a corresponding pulse from the back wall of said member, means for terminating a timing period if a reflection of a corresponding pulse is not received at the transducer within a predetermined time after start of the time period, means for producing a succession of clock pulses, means for counting the total number of clock pulses that occur during a predetermined number of timing periods that are concluded only by the receipt of a reflection from the back surface, and means providing a representation of the average of the number of pulses counted during said timing periods that are concluded only by a reflection from the back surface.

10. Ultrasonic inspection apparatus, comprising ultrasonic transducer means for directing repetitive ultrasonic energy pulses onto and through a front surface of a walled member whose average wall thickness is to be measured, means for producing a succession of first signals in response to the receipt at said transducer means of respective reflected pulses from said front surface, means for producing a succession of second signals in response to the receipt at said transducer means of respective reflected pulses from the back surface of said member, means for starting a respective timing period in response to each of said first signals, means for stopping each of said timing periods a predetermined maximum time after its start, or alternatively, in response to a respective second signal occurring before said predetermined maximum time, whichever is first to occur, means for providing clock pulses, means for counting the total number of clock pulses that occur during each occurrence of a predetermined number of timing periods that are concluded only by a respective second signal, means for providing a succession of coded signals representing, respectively, said total number of pulses counted in each predetermined number of timing periods, and means responsive to said coded signals for providing an indication or read out representing the average number of pulses counted during each timing period in said predetermined number.

11. Apparatus claimed in claim 10 wherein the means for providing an indication or read out includes, digital to analog converter means responsive to said coded signals for providing corresponding analog signals, each of said analog signals persisting at its corresponding analog value until the occurrence of the next coded signal.

12. The combination claimed in claim 10 wherein said means for counting the total number of clock pulses that occur during each occurrence of a predetermined number of timing periods that are concluded only by a respective second signal comprises, counting means for counting clock pulses during each timing period, means for producing a set pulse each time a timing period is concluded by a second signal, means responsive to a set pulse for transferring the count from said counting means only at the conclusion of a timing period associated with a respective set pulse, and means for producing a total count of the counts transferred from the counting means in a predetermined number of timing periods that are associated with the production of a respective set pulse.

13. In a method of making an average wall thickness measurement of a walled member, the steps comprising directing ultrasonic energy from an ultrasonic transducer means onto and through a front surface of said member, starting a timing period at a time representing the time of incidence of said energy at the front surface of said member, concluding said timing period in response to receiving at said transducer means a reflection of ultrasonic energy from the back wall of the member, thereby to represent the propagation time of ultrasonic energy through the member, or alternatively concluding said timing period at a predetermined maximum time if reflected energy has not been received at the transducer means from said back wall, producing a set pulse when the timing period concludes before said predetermined maximum time, preventing the production of a set pulse if reflected energy from the back wall has not been received at the transducer before said predetermined maximum time, producing regularly occurring clock pulses, producing a coded signal representing the number of clock pulses that occur during a timing period, repeating the above steps to produce a plurality of set pulses and a plurality of coded signals, and gating respective ones of the coded signals to further signal processing means only when a set pulse is produced at the conclusion of the corresponding timing period.

* * * * *